United States Patent [19]
Gauch

[11] 3,903,701
[45] Sept. 9, 1975

[54] FLOATING BOOM
[75] Inventor: George J. Gauch, Greenville, R.I.
[73] Assignee: Uniroyal, Inc., New York, N.Y.
[22] Filed: Apr. 22, 1971
[21] Appl. No.: 136,377

[52] U.S. Cl. .................................................. 61/1 F
[51] Int. Cl.² ......................................... E02B 15/04
[58] Field of Search .................... 61/1 F, 5; 160/378

[56] References Cited
UNITED STATES PATENTS

| | | | |
|---|---|---|---|
| 2,351,373 | 6/1944 | Thexton | 160/387 |
| 2,943,676 | 7/1960 | Grenci | 160/387 |
| 3,184,923 | 5/1965 | Galvaing | 61/5 |
| 3,592,006 | 7/1971 | Crucet | 61/1 F |

FOREIGN PATENTS OR APPLICATIONS

| | | | |
|---|---|---|---|
| 1,296,856 | 5/1962 | France | 61/1 F |
| 1,249,315 | 11/1960 | France | 61/1 F |

Primary Examiner—Peter M. Caun
Attorney, Agent, or Firm—Norbert P. Holler, Esq.

[57] ABSTRACT

A floating boom in which a flexible sheet forms a barrier on the surface of a liquid for confining materials, e.g., pollutants floating thereon. A plurality of floats support the sheet such that portions of the latter extend above and beneath the surface of the liquid. Stiffeners reinforce the sheet and cooperate therewith in resisting external forces applied thereto.

11 Claims, 3 Drawing Figures

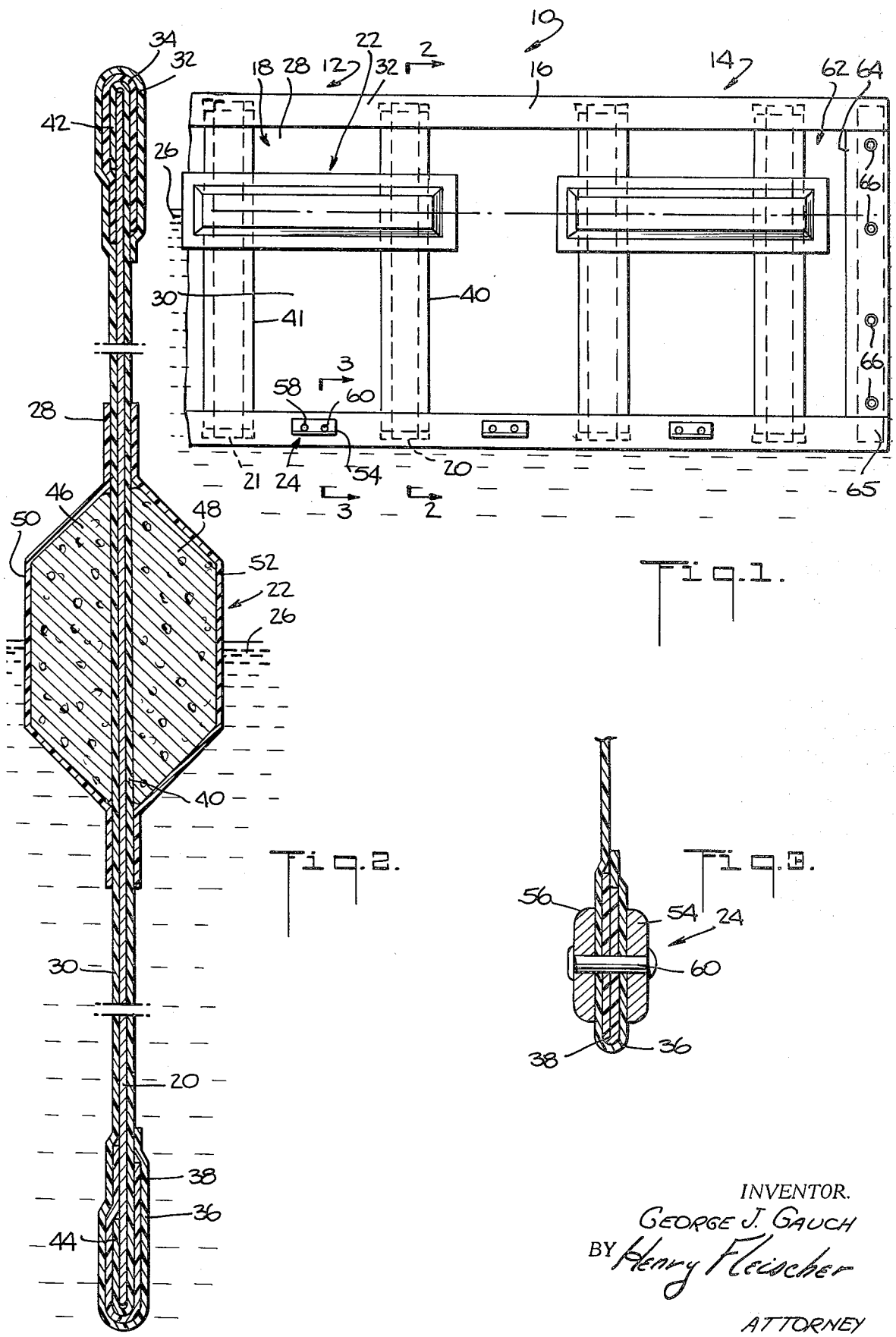

FLOATING BOOM

The foregoing abstract is neither intended to define the invention disclosed in the specification, nor is it intended to be limiting as the scope in any way.

BACKGROUND OF THE INVENTION

The invention relates generally to a floating boom for confining material floating on a liquid, and more particularly concerns a boom including a sheet member having portions thereof extending above and below the liquid surface for containing pollutants, such as oil, floating thereon.

Oil spills have created problems of increasing seriousness in many parts of the world during recent years. Since oil has a density lower than water, it will float and spread over wide areas and thereby constitutes a dangerous pollution source. In several cases, large oil tankers wrecked at sea have spilled thousands of gallons of crude oil into the ocean near beaches, harbors and shore installations. Ruptured hoses and leaking fittings at refineries and shipping terminals have also created serious oil spills in busy harbors. This spilled floating oil is a fire hazard in addition to polluting nearby land areas. It is therefore highly desirable to restrict spilled oil as rapidly as possible to as small an area as possible in order to facilitate its recovery, minimize pollution and reduce the potential fire hazard. Consequently, many states and cities are adopting statutes requiring that booms, to contain spilled oil, be available at all oil transfer installations.

Heretofore various types of booms have been devised to confine material floating on the surface of a liquid. The function of such a boom is to prevent oil or similar products from spreading, thereby isolating the pollutant in an area where it can be removed from the surface. With the boom confining the oil, authorities can concentrate on cleaning it up by skimming it from the surface, applying straw to absorb the oil or spraying the oil with chemicals.

Another problem, less drastic but equally annoying in nature, is the presence of floating trash in waters adjacent to beaches. The rising extent of this problem need hardly be pointed out, since everyone is aware of state and federal efforts to halt "littering." However, it is unlikely that total cessation of the dumping of refuse into the sea will ever be accomplished. At most beaches, refuse is washed up along the entire length by waves and wind, destroying the beauty of entire recreational areas. Thus an economical method for directing this floating waste to central points for collection is urgently needed.

Suitable booms are available which will adequately prevent floating pollutants from passing thereunder. However, such conventional booms do not provide an adequate dam above the surface of the water that prevents oil or trash from being washed thereover. Some conventional booms attempt to overcome the aforementioned difficulty by having a continuous float member or a plurality of float members, adjacent to one another, extending along the entire length of a downwardly depending sheet member. In such booms, the float member or members serve as a dam. The height of such a dam is generally insufficient to confine pollutants which wash thereover. Other conventional systems have float members with fins extending vertically upwardly therefrom, such fins are designed to prevent pollutants from being washed therover. However, in typical systems of this nature the fins are easily deflected by the forces generated by water washing over the float members, and therefore fail to confine the pollutants floating thereon. To resolve the difficulty noted above, large and unwieldly systems were developed. However, systems of this type introduced other problems. For example, they were relatively stiff and inflexible, and, as such, did not flex synchronously with the undulations of the water surface, thereby resulting in the pollutants being washed over the boom. As a result, the boom, in addition to being large and unwieldly, would often fail to properly confine floating pollutants. Because many of the conventional booms now in use are difficult to transport to and handle at the site of pollution, a lengthy period of time may often elapse before such a conventional boom can be brought to and assembled at the site, thereby permitting the spread of floating pollutants across large areas of water, and by the greater difficulty in containing the spread, result in the subsequent pollution also of land areas.

Accordingly, it is a primary object of the present invention to provide a floating boom for forming a barrier above and beneath the surface of a liquid which will overcome the aforesaid disadvantages.

An additional object of the present invention is to provide a floating boom which prevents floating pollutants from passing over or under the boom.

Another object of the present invention is to provide a boom which may be readily transported to and assembled at the site of the pollutants in any desired length and just as readily dismantled and stored for future use.

A related object of the present invention is to provide a boom which may be stored and transported in a relatively limited space.

A further object of the present invention is to provide a boom of the above type which is relatively inexpensive to manufacture and maintain, and which may be easily manipulated in the repeated installation and use thereof.

SUMMARY OF THE INVENTION

Briefly stated, and in accordance with the present invention, there is provided a floating boom which forms a barrier on the surface of a liquid, e.g., a body of water. The boom includes preferably a plurality of float sections which are spaced from one another so as to enable the boom to flex readily in synchronism with the undulations of the water. Each section includes a flexible sheet member secured to a float member. The upper and lower portions of the sheet member are adapted to extend away from opposite sides of the float member. Stiffener means are operatively associated with the sheet member and extend from the region of the lower marginal edge of the sheet member to the region of the upper marginal edge of the sheet member. The stiffener means provides reinforcement for the sheet member and supports the upper and lower portions thereof with respect to the float member. In this way each float section, including the upper and lower portions of the respective sheet member, is able to pivot about its float member. The portions of each sheet member, thus, cooperate with one another in resisting external forces exerted thereon.

In accordance with a further aspect of the present invention, each float member includes a pair of buoyant members. The pair of buoyant members overlap one another throughout at least a common longitudinal portion of the float member. The sheet member is interposed between the pair of buoyant members throughout the common longitudinal portion of the float member. The stiffener means is also interposed between the pair of buoyant members within the aforementioned common longitudinal portion of the float member.

Thus, according to the present invention there is provided a boom for containing pollutants floating on the surface of water. The boom has a plurality of float sections, each of which includes a sheet member having stiffener means associated therewith for providing reinforcement thereto. A float member supports the sheet member with an upper portion of the sheet member extending substantially vertically upwardly above the surface of the water, while the lower portion thereof extends substantially vertically downwardly into the water. The sections are spaced from one another by means of flexible sheet portions so as to permit forming of an enclosure of any desired size for confining floating pollutants therein. Furthermore, a string of the sections is readily folded, in accordion fashion, so as to enable the entire boom to be easily transported to and assembled at the site where it is desired to confine the pollutants.

BRIEF DESCRIPTION OF THE DRAWINGS

Other objects and advantages of the invention will become apparent upon reading the following detailed description and upon reference to the drawings, in which:

FIG. 1 is a partial elevational view showing a portion of the boom in which a plurality of float members support a sheet member according to the preferred embodiment of the present invention;

FIG. 2 is an enlarged sectional view taken along the line 2—2 of FIG. 1 in the direction of the arrows; and FIG. 3 is an enlarged fragmentary sectional view taken along the line 3—3 of FIG. 1 in the direction of the arrows.

While the invention will be described in conjunction with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

With continued reference to the drawings, wherein like reference numerals have been used throughout to designate like elements, FIG. 1 illustrates a portion of the entire floating boom, generally indicated by the reference numeral 10. Boom 10 includes a plurality of (in this instance two) float sections, shown generally at 12 and 14. Float sections 12 and 14 are spaced from one another by sheet portion 16. The float sections 12 and 14 are substantially identical. For this reason only float section 12 will be described in detail.

As shown in FIG. 1, float section 12 of boom 10 includes a sheet member, designated generally at 18, stiffener means 20 and 21, a float member, depicted generally at 22, and weight means, designated generally at 24. The boom 10 floats on the surface of a liquid 26, for example, a lake, river, or ocean. Sheet member 18 is supported in liquid 26 by float member 22 secured thereto at an intermediate height so as to divide sheet member 18 into upper and lower portions 28 and 30, respectively. Upper portions 28 is adapted to extend substantially in a vertically upwardly direction from float member 22, thereby forming a dam, or fence, for preventing floating materials confined by boom 10 from being washed over. Lower portion 30 is adapted to extend substantially vertically downwardly from float member 22 into liquid 26, for preventing materials floating thereon from passing beneath boom 10. It is evident that float section 12 of boom 10 has upper and lower portions 28 and 30 extending respectively above and beneath the surface of a liquid to thereby confine floating pollutants.

As shown more clearly in FIG. 2, upper marginal edge portion 32 of sheet member 18 is folded over a first reinforcing strip 34 and is stitched or otherwise suitably connected to itself so as to form a sleeve, or overlap, through which reinforcing strip 34 extends. Reinforcing strip 34 is folded back onto itself so as to provide additional stiffness and tensile strength at upper marginal edge portion 32 of sheet member 18. Similarly, lower marginal edge portion 36 of sheet member 18 is folded over a second reinforcing strip 38 and is stitched or otherwise suitably connected to itself so as to form a sleeve, or overlap, through which reinforcing strip 38 extends. Reinforcing strip 38 also is folded back onto itself so as to provide additional stiffness and tensile strength at lower marginal edge portion 36 of sheet member 18. Sheet member 18 and reinforcing strips 34 and 38 are made from a flexible waterproof material which may be a polymer coated fabric, e.g., rubber or plastic coated nylon.

Turning once again to FIG. 1, stiffener means in the form of a pair of struts 20 and 21, are secured to sheet member 18. The struts 20 and 21 extend substantially from the region of the lower marginal edge portion 36 of sheet member 18 to the region of the upper marginal edge portion 32 thereof. The struts 20 and 21 are spaced from one another lengthwise of sheet member 18. Struts 20 and 21 are made from metal which may be corroded by the environment in which they are placed. Thus, cover pieces 40 and 41 are used to secure struts 20 and 21, respectively, to sheet member 18. Cover pieces 40 and 41 are also made from a polymer coated fabric, e.g., rubber or plastic coated nylon, and have their marginal edges vulcanized or otherwise suitably fastened to sheet member 18 so as to form corresponding liquid-tight pockets for the respective struts 20 and 21. In this way struts 20 and 21 are secured to sheet member 18 and thereby protected from any deterioration due to the liquid 26 in which they are immersed.

Referring again to FIG. 2, the upper marginal edge portion 42 of cover piece 40 is illustrated therein as being folded back over the upper end portion of strut 20 and against strut 20. Similarly, lower marginal edge portion 44 of cover piece 40 is also folded back over the lower end portion of strut 20 and against strut 20. Strut 20 and the corresponding cover piece 40 thereof are secured to sheet member 18 such that both strut 20 and cover piece 40 have their corresponding upper and lower portions interposed between the folded over portions of reinforcing strips 34 and 38, respectively. The aforementioned folded over portions 42 and 44 of cover piece 40, in conjunction with reinforcing strips 34 and 38 strengthen those regions of sheet member 18 which are subjected to large shear stresses from strut 20. The struts 20 and 21 reinforce the upper and lower portions 28 and 30, respectively, of sheet member 18. As a result, the portions 28 and 30 of sheet member 18 are adapted to pivot substantially as a unit about float member 22 so as to cooperate with one another in resisting external moments and forces applied thereto by waves on the surface of liquid 26. Hence, when waves, currents or other activity on or near the surface of liquid 26 applies a force to sheet member 18, it will be resisted by the respective upper and lower portions 28 and 30 thereof cooperating with one another via the interconnection of struts 20 and 21 which act substantially as a rigid element. As a consequence thereof, sheet member 18 will tend to remain substantially in a stable upright position even though subjected to external moments and forces by liquid 26. In this manner a relatively inflexible barrier is formed so as to thereby entrap pollutants floating therein.

As best shown in FIG. 2, float member 22 may include a pair of buoyant members, e.g., a first buoyant member 46 and a second buoyant member 48. Buoyant members 46 and 48 overlap one another thoughout at least a common longitudinal portion of float member 22. Sheet member 18 is interposed between the pair of buoyant members 46 and 48 in at least the common longitudinal portion of float member 22. Moreover, struts 20 and 21 are also interposed between buoyant members 46 and 48 within the common longitudinal portion of float member 22. Buoyant members 46 and 48 are made preferably substantially of a solid material, such as any suitable type of foam plastic. Although buoyant members 46 and 48 may be made from various types of foam, it is desirable to use foam sold under the trademark Ensolite made by Uniroyal Inc., of New York, N.Y., or from a suitable polyethylene foam. The foam utilized for buoyant members 46 and 48 is preferably of the closed cell variety. This insures that the foam will not absorb any liquid and will remain buoyant even if surrounded by liquid.

Casings 50 and 52 secure corresponding buoyant members 46 and 48 to sheet member 18. The casings 50 and 52 are also made preferably from a polymer coated fabric, such as rubber or plastic coated nylon, and are vulcanized or otherwise suitably fastened to sheet member 18 so as to form a liquid-tight repository for respective buoyant members 46 and 48. Thus, casings 50 and 52 secure corresponding buoyant members 46 and 48 to sheet member 18 and also provide for protection of the buoyant members, i.e., protection from any deterioration caused by the environment in which they function. The location of buoyant members 46 and 48 with respect to the height of sheet member 18 is chosen such as to provide an effective barrier to pollutants floating on the surface of liquid 26.

By way of example, struts 20 and 21 are made preferably from thin strips of spring steel, the strips may be about 0.042 inches thick. Preferably, float section 12 extends about 19 inches lengthwise of boom 10, whereas sheet portion 16 extends about 21 inches lengthwise of boom 10. Buoyant members 46 and 48 support sheet member 18 such that lower portion 30 thereof depends into liquid 26 substantially in a vertically downwardly direction for a distance of approximately 24 inches. While upper portion 28 of sheet member 18 extends substantially in a vertically upwardly direction for a distance of approximately 11 inches. Thus, it is evident that about two-thirds of sheet member 18 extends downwardly beneath the surface of liquid 26, and about one-third thereof extends upwardly above the surface of liquid 26. Hence, when waves on the surface of liquid 26 apply a moment to upper portion 28, both upper and lower portions 28 and 30, via the interconnection of struts 20 and 21, pivot as a unit about float member 22. As lower portion 28 pivots about float member 22, its movement is impeded by liquid 26 and a counter moment is developed by the force of liquid 26 exerted thereon so as to restore sheet member 18 to a stable vertical position.

Turning once again to FIG. 1, weight means 24 is secured to the overlapped lower marginal edge portion 36 of sheet member 18 so as to aid in maintaining sheet member 18 extending substantially in a vertically downwardly direction. Referring now to FIG. 3, weight means 24 is depicted therein as including a pair of ballast weights 54 and 56. Ballast weights 54 and 56 are affixed to sheet member 18 such that the lower marginal edge portion 36 of sheet member 18 is interposed between the pair of ballast weights. A pair of rivets 58 and 60, or other suitable fastening means, secure ballast weights 54 and 56 to the lower marginal edge portion 36 of sheet member 18 and to one another. Ballast weights 54 and 56 overlap one another. Rivets 58 and 60 pass through the overlapping portions thereof, as well as through lower marginal edge portion 30 interposed therebetween. These ballast weights 54 and 56 are preferably made from a dense, corrosion resistant material, such as lead. Similarly, rivets 58 and 60 are also preferably of a corrosion resistant material, e.g., brass or any other suitable metal. Thus, weight means 24 is adapted to aid in maintaining the lower portion 30 of sheet member 18 taut and extending substantially in a stable vertically downwardly direction.

Upon further inspection of FIG. 1 it will be noted that essentially identical float sections 12 and 14 are integrally connected to one another by sheet portion 16. Sheet portion 16 also includes weight means 24 disposed thereon as was heretofore described for float sections 12 and 14. Sheet portion 16 differs from float sections 12 and 14 primarily in that it does not include float member 22 and stiffener means, or struts, 20 and 21. Hence, sheet portion 16 is extremely flexible, in both the horizontal and vertical directions, so as to permit boom 10 to follow synchronously the undulations of liquid 26, i.e., boom 10 rides smoothly over any waves occurring on the body of water rather than permitting the waves to wash thereover. Furthermore, this flexible portion, i.e., sheet portion 16, enables boom 10 to be stored in a relatively limited space, since boom 10 can be folded easily along sheet portion 16, in accordion fashion, when not in use. The length of the individual sheet portions and float sections may vary to suit the convenience of manufacturing and handling. Floating boom 10 may include a plurality of float sections and sheet portions. For example, a single boom 10 may have as many as several hundred float sections and sheet portions, of the type hereinbefore set forth.

Incidentally, it will be appreciated that opposed end panels of boom 10 are made preferably of sheet portions similar to portion 16. One such end panel, designated generally at 62, is shown in FIG. 1. Each of such end panels 62 has one vertical marginal edge portion 64 folded over a strut 65 that is stitched or otherwise suitably connected against itself so as to form a sleeve, or overlap, through which strut 65 extends. These vertical marginal edge portions 64 of opposed end panels 62 are preferably overlapped and fastened together to form boom 10 into an enclosure for confining floating pollutants therein. In so doing, the opposed end panels 62 are secured to one another by means of a plurality (in this instance four) grommets 66, made preferably of brass or any other suitable corrosion resistant metal. Grommets 66 pass through vertical marginal edge portion 64 of end panel 62 and are fastened to strut 65 thereof in a spaced vertical relation from one another. The vertical marginal edge portions 64 of opposed end panels 62 overlap one another and are pressed into each other so as to form a substantially liquid-tight seal.

In order to tow floating boom 10 through liquid 26, a bridle, not shown, may be fastened to the accessible extremities of boom 10. Moreover, in order to maintain boom 10 in a predetermined location at the site of the pollution, an anchoring device, not shown, may be fastened to boom 10. Thus, if desired, boom 10 may be assembled at a convenient location and towed subsequently, on the surface of liquid 26, in its assembled condition, to the site of the pollution where it may be anchored in place.

It is clear from the foregoing description that the herein described floating boom is composed of a plurality of spaced float sections connected to one another by flexible sheet portions which may be transported readily and/or stored in relatively small and compact packages. The boom is highly flexible and in use, the float members in conjunction with the sheet member cooperating with the stiffener means, provide an effective barrier for preventing the spread of floating pollutants. Not only are floating pollutants prevented from passing beneath the float members by the vertically downwardly depending portion of the sheet member, but the vertically upwardly extending portion thereof prevents pollutants from being washed thereover. Stiffener means, such as struts extending from the upper marginal edge portion to the lower marginal edge portion of the sheet member, reinforce the upper and lower portions of the sheet member so as to cause these portions to pivot, as a unit, about the float member. Thus, when waves on the surface of the liquid apply a moment to the upper portion of the sheet member, both the upper and lower portions thereof interact, via the interconnection of the stiffener means, to develop a restoring moment so as to maintain the sheet member in a stable vertical orientation. In this way, the upper and lower portions of the sheet member cooperate with one another and together act substantially as a single rigid member so that the upper portion thereof has substantially greater resistance to forces applied thereto and as such will not readily deflect. Hence, the sheet member will tend to remain substantially in a stable vertical orientation so as to confine pollutants even under the forces generated by waves in a body of water. Furthermore, by adding or substracting float sections and sheet portions any desired length of barrier may be obtained readily. In addition, the entire boom has substantially its entire exterior surface made of polymer coated fabrics vulcanized, or otherwise suitably fastened, to one another so as to form a corrosion resistant sealed system. Moreover, an apparatus constructed in accordance with the present invention has substantially reduced manufacturing and transportation costs, and may be readily used maintenance free over extended periods of time. In this way a relatively easily manufacturable, maintenance free enclosure may be formed. An enclosure so formed has no openings therein through which pollutants can pass, or be washed over, thereby providing an improved barrier for confining floating pollutants.

It will be further understood that while described herein in connection with substantially solid float members, the present invention is not limited to such. For example, inflatable float members suitably secured to the sheet member are also intended to be included within the scope of the present invention.

Thus it is apparent that there has been provided, in accordance with the present invention, a floating boom for confining pollutants floating on the surface of a body of water that fully satisfies the objects, aims and advantages set forth previously. While the invention has been described in conjunction with specific embodiments thereof, it is evident that many alternatives, modifications, and variations will be apparent to those skilled in the art in light of the foregoing description. Accordingly, it is intended to embrace all such alternatives as fall within the spirit and broad scope of the appended claims.

Having thus described my invention, what I claim and desire to protect by Letters Patent is:

1. A floating boom comprising an elongate sheet member of flexible material, a plurality of resilient stiffener members secured upon and extending in parallel relation laterally of said sheet member, said stiffener members being spaced from one another longitudinally of said sheet member and defining therebetween flexible sheet zones universally responsive flexibly to undulating surges of liuqid flow thereagainst, said stiffener members each comprising spring steel and having a common narrow extent of substantially lesser dimension than the extent of said flexible sheet zones longitudinally of said sheet member, and a plurality of elongate float members secured in colinearly endwise spaced relation upon and extending in a common longitudinal direction with said sheet member, said float members bridging respective pairs of said stiffener members which are spaced from one another longitudinally of said sheet member through the intermediary of respective alternate flexible sheet zones, said float members overlying respective portions of flexible sheet zones which are disposed between the stiffener members of each bridged pair and which alternate with said alternate flexible sheet zones, said float members being intermediately disposed between longitudinally extending marginal edges of said sheet member such that the latter is generally divided longitudinally into an upper debris-confining section and a lower fluid-submergible section, said boom thereby being flexible both longitudinally and laterally thereof, whereupon, when subjected to undulating surges of liquid flow thereagainst, said alternate flexible sheet zones which are disposed between respective bridged pairs of stiffener members, said flexible sheet zones which are respectively disposed between the stiffener members of each bridged pair, and said stiffener members all flexibly respond as an energy absorbing array which is at least partially reinforced against buckling by said float members which bridge the respective pairs of said stiffener members.

2. A floating boom as recited in claim 1 wherein said upper debris-confining section and said lower fluid-submergible section have respective extents laterally of said sheet member in the ratio of approximately 1:2.

3. A floating boom as recited in claim 1, wherein each of said stiffener members comprises at least one substantially rigid strut connected to and extending transversely of a respective float member.

4. A floating boom as recited in claim 1, wherein each said float member comprises first and second oppositely directed buoyant members overlapping one another throughout at least a common longitudinal portion of each said float member, said sheet member being interposed between said buoyant members within the common longitudinal portion of each said float member.

5. A floating boom as recited in claim 4, wherein said stiffener members are respective struts, one of said struts being in a spaced relationship lengthwise of said float member with the other of said struts and interposed between said buoyant members of each said float member within the common longitudinal portion of each said float member.

6. A floating boom as recited in claim 5, further comprising a pair of cover pieces, one of said cover pieces having its upper marginal edge portion folded back over and against the upper end portion of said one of said struts and its lower marginal edge portion folded back over and against the lower end portion of said one of said struts, said cover pieces being secured to said sheet member so as to form a substantially liquid-tight pocket for said one of said struts, the other of said cover pieces having its upper marginal edge portion folded back over and against the upper end portion of said other of said struts and its lower marginal edge portion folded back over and against the lower end portion of said other of said struts, said other of said cover pieces being secured to said member so as to form a substantially liquid-tight pocket for said other of said struts.

7. A floating boom as recited in claim 6, further comprising first and second reinforcing strips, said first reinforcing strip extending lengthwise of said sheet member and being folded back over and against the upper marginal edge portion of said pair of cover pieces and extending beyond said pair of cover pieces against said pair of struts, said sheet member having its upper marginal edge portion folded back over said first reinforcing strip and fastened to itself so as to secure said first reinforcing strip to the upper portion of said sheet member, said second reinforcing strip extending lengthwise of said sheet member and being folded back over and against the lower marginal edge portion of said pair of cover pieces and extending beyond said pair of cover pieces against said pair of struts, said sheet member having its lower marginal edge portion folded back over said second reinforcing strip and fastened to itself so as to secure said second reinforcing strip to the lower portion of said sheet member, said first and said second reinforcing strips thereby providing additional stiffness and tensile strength at the corresponding upper and lower marginal edge portions of said sheet member.

8. A floating boom as recited in claim 4, wherein each of said buoyant members of each said float member is made substantially from a solid material.

9. A floating boom as recited in claim 4, wherein said sheet member is made substantially from a polymer coated fabric.

10. A floating boom as recited in claim 1, further comprising non-buoyant weight means secured to the lower marginal edge portion of said sheet member so as to maintain said sheet member extending substantially in a vertically downwardly direction.

11. A floating boom as recited in claim 10 wherein said weight means includes a plurality of weighted elements spaced from one another longitudinally of said sheet member and disposed in each of said flexible sheet zones between respective pairs of stiffening members bridged by said float members and between unbridged stiffening members.

* * * * *